US011945255B2

(12) United States Patent
Raksha et al.

(10) Patent No.: US 11,945,255 B2
(45) Date of Patent: Apr. 2, 2024

(54) OPTICAL SECURITY ELEMENT

(71) Applicant: VIAVI SOLUTIONS INC., Chandler, AZ (US)

(72) Inventors: Vladimir P. Raksha, Santa Rosa, CA (US); Cornelis Jan Delst, Fairfax, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 17/839,013

(22) Filed: Jun. 13, 2022

(65) Prior Publication Data

US 2022/0396088 A1 Dec. 15, 2022

Related U.S. Application Data

(60) Provisional application No. 63/210,365, filed on Jun. 14, 2021.

(51) Int. Cl.
*B42D 25/369* (2014.01)
*B42D 25/40* (2014.01)

(52) U.S. Cl.
CPC ........... *B42D 25/369* (2014.10); *B42D 25/40* (2014.10)

(58) Field of Classification Search
CPC .............................. B42D 25/369; B42D 25/40
See application file for complete search history.

(56) References Cited

U.S. PATENT DOCUMENTS

| | | | |
|---|---|---|---|
| 5,591,527 A | 1/1997 | Lu | |
| 5,938,579 A | 8/1999 | Cavazos | |
| 7,047,883 B2 | 5/2006 | Raksha et al. | |
| 7,517,578 B2 | 4/2009 | Raksha et al. | |
| 8,343,615 B2 | 1/2013 | Raksha et al. | |
| 8,499,687 B2 | 8/2013 | Gygi et al. | |
| 8,813,644 B2 | 8/2014 | Gygi et al. | |
| 10,259,254 B2 | 4/2019 | Raksha et al. | |
| 10,391,519 B2 | 8/2019 | Degott et al. | |
| 10,500,611 B2 | 12/2019 | Raksha et al. | |
| 2007/0172261 A1 | 7/2007 | Raksha et al. | |
| 2017/0305184 A1* | 10/2017 | Muller | B05D 5/065 |
| 2019/0322112 A1* | 10/2019 | Ren | B41F 19/005 |

FOREIGN PATENT DOCUMENTS

| | | |
|---|---|---|
| DE | 102013015277 A1 | 3/2015 |
| WO | 2020-025482 A1 | 2/2020 |

* cited by examiner

*Primary Examiner* — Laura A Gudorf
(74) *Attorney, Agent, or Firm* — Mannava & Kang, P.C.

(57) ABSTRACT

An assembly including a first magnet; a substrate positioned above the first magnet, and having a surface for receiving a composition including a plurality of magnetizable platelets; and a second magnet, positioned above the substrate is disclosed. The assembly can be used in a method of making an optical security element. The optical security element and the method of making the optical security element are also disclosed.

19 Claims, 15 Drawing Sheets

OPTICAL SECURITY ELEMENT

PRIORITY

This application claims the benefit of U.S. Provisional Patent Application Ser. No. 63/210,365 filed on Jun. 14, 2021. The disclosures of the above application are hereby incorporated by reference for all purposes.

FIELD OF THE INVENTION

The present disclosure generally relates to an assembly including a first magnet; a substrate positioned above the first magnet, and having a surface for receiving a composition including a plurality of magnetizable platelets; and a second magnet, positioned above the substrate. The assembly can be used in a method of making an optical security element. The optical security element and the method of making the optical security element are also disclosed.

BACKGROUND OF THE INVENTION

The current technology for the production of articles with security elements, such as banknotes, employs a single cylinder with embedded magnets. The embedded magnets align magnetic particles in an ink composition. In particular, a substrate with the ink composition is moved over the single cylinder. The embedded magnets produce a magnetic field that protrudes from one magnet toward another and mostly along a plane of the substrate. The magnetic particles in the ink composition are therefore subjected to this magnetic field, and create a singular optical effect.

There are two main methods for producing optical security elements: continuous and discrete. In a continuous method, platelets are oriented along a X coordinate, in a Cartesian coordinate system, of a continuously moving substrate with statically mounted magnetic assemblies. In a discrete method, platelets are oriented along the X and Y coordinates, of a continuously moving substrate with magnetic assemblies moving in the direction of the substrate at the same speed. The number of optical effects produced by the discrete method is much larger than by the continuous method.

What is needed is a way to produce articles with security elements with varying and/or different optical effects. The production of these articles should be capable of being generated in an efficient (time and cost) assembly system.

BRIEF DESCRIPTION OF THE DRAWINGS

Features of the present disclosure are illustrated by way of example and not limited in the following figure(s), in which like numerals indicate like elements, in which.

SUMMARY OF THE INVENTION

In an aspect, there is disclosed an assembly including a first magnet; a substrate positioned above the first magnet, and having a surface for receiving a composition including a plurality of magnetizable platelets; and a second magnet, positioned above the substrate.

In another aspect, there is disclosed a method of producing an optical security element, can include moving a substrate, in a feed direction, between a first cylinder including a first magnet and a second cylinder including a second magnet; and rotating the first cylinder and the second cylinder at a same speed as the substrate; wherein a composition including a plurality of magnetizable platelets is present on a surface of the substrate.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are articles, such as banknotes with security elements; assemblies for use in a method of making the articles; and methods of making and using the articles and/or assemblies.

Figure 1:
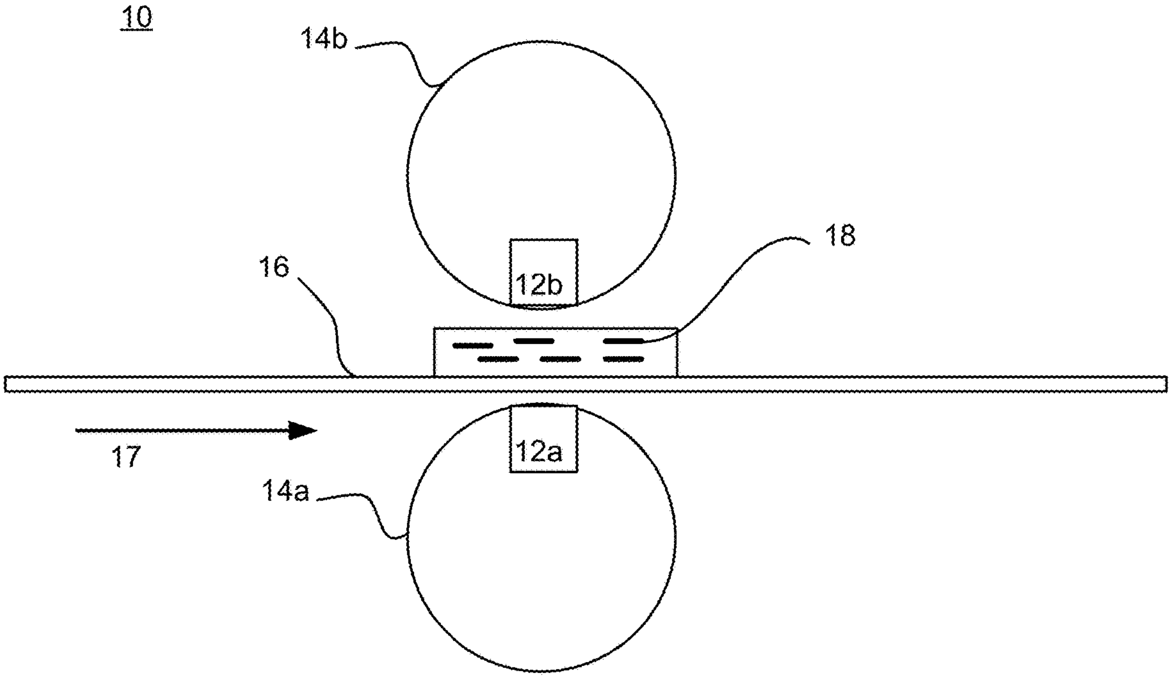
FIG. 1 illustrates an assembly including a first magnet; a substrate positioned above the first magnet; a composition on a surface of the substrate and including a plurality of magnetizable platelets; and a second magnet, positioned above the substrate, according to an aspect of the invention.

The present disclosure describes an assembly 10 including a first magnet 12*a*; a substrate 16, positioned above the first magnet 12*a*, and having a surface for receiving a composition including a plurality of magnetizable platelets 18; and a second magnet 12*b*, positioned above the substrate 16, as shown in FIG. 1. As discussed in more detail herein, the substrate 16 can move between two cylinders 14*a*, 14*b*, for example, a first cylinder 14*a* including the first magnet 12*a* and a second cylinder 14*b* including the second magnet 12*b*. The substrate 16 can move, in a feed direction 17, at the same or substantially the same speed as the rotation of the first and second cylinders 14*a*, 14*b*. The first magnet 12*a* is registered with respect to the first cylinder 14*a*, and the second magnet 12*b* is registered with respect to the second cylinder 14*b*. The substrate 16 can move through a magnetic field 20 generated by the first magnet 12*a* and the second magnet 12*b* to align the plurality of magnetizable platelets 18.

The substrate 16 can be any material capable of receiving a composition including a plurality of magnetizable platelets 18. Non-limiting examples of the substrate include paper, cardboard, plastic, etc. The substrate 16 can have a surface for receiving the composition.

The plurality of magnetizable platelets 18 can be dispersed in a binder. The plurality of magnetizable platelets 18 can be present in the composition in an amount sufficient to allow movement, such as alignment or orientation, of the plurality of magnetizable platelets 18 within the binder. The composition can include additional additives. The composition can be an ink, a pain, or a varnish.

The plurality of magnetizable platelets 18 can be any platelets including a magnetic material that can align and/or orient in a magnetic field 20. Non-limiting examples of magnetizable platelets 18 include NOVAMET™ (available from Novamet Specialty Products Corporation) magnetically soft nickel or stainless-steel platelets produced by the ball-mill technique; platelets of magnetizable material produced by vacuum deposition technique; and magnetizable platelets that are monochromatic or color-shifting thin-film interference security pigments containing a magnetizable material in their structure.

Figure 2:
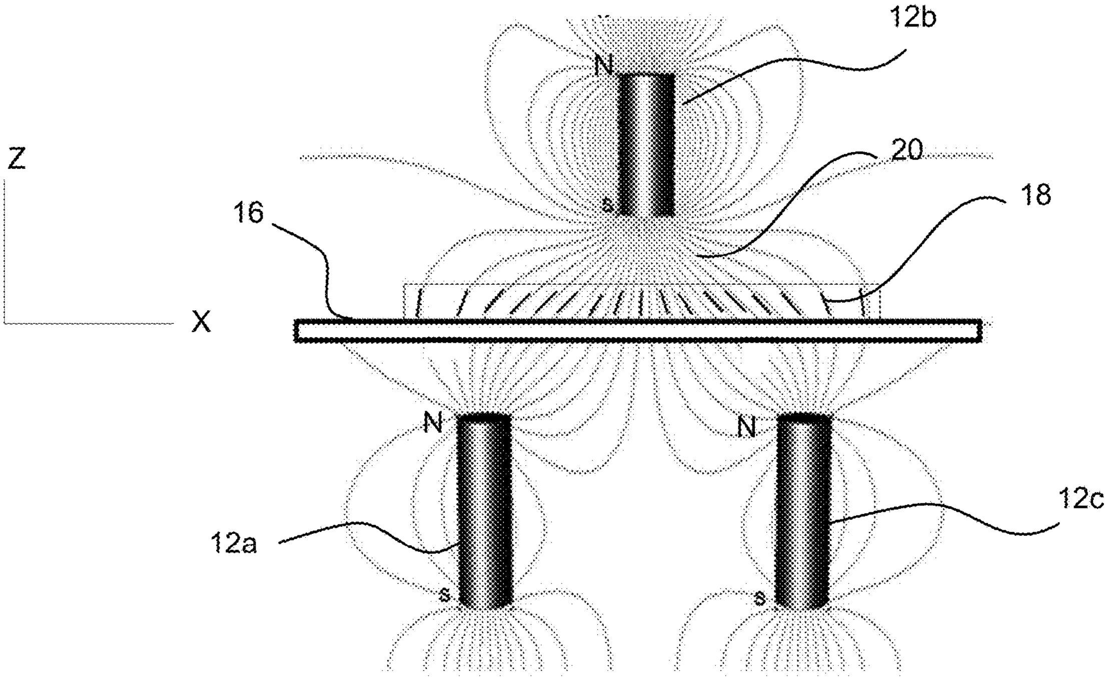
FIG. 2 is a cross-section of an assembly according to another aspect of the invention.

The magnetic field 20 generated by the first magnet 12*a*, the second magnet 12*b*, and the third magnet 12*c* goes up from XY to Z direction, as illustrated in FIG. 2. A composition including a plurality of magnetizable platelets 18 is present on a surface of a substrate 16. The plurality of magnetizable platelets 18 can be aligned in the magnetic field 20, such as in the Z direction. In this manner, a variety of optical effects can be achieved that is not possible with a single cylinder/magnet and its associated magnetic field.

The assembly 10 can include two or more magnets 12, such as a first magnet 12*a*, a second magnet 12*b*, a third magnet 12*c*. The assembly can include a plurality of magnets in which at least one magnet 12*a* is positioned below a substrate 16 and at least one magnet 12*b* is positioned above a substrate 16. As shown in FIG. 1, a first magnet 12*a* can be incorporated or embedded into a first cylinder 14*a* and a second magnet 12*b* can be incorporated or embedded into a second cylinder 14*b*.

The assembly can include a first cylinder 14*a* and a second cylinder 14*b* positioned with the substrate between them. The first cylinder 14*a* and the second cylinder 14*b* can be aligned together, for example, with the second cylinder 14*b* directly across a substrate 16 from the first cylinder.

The first cylinder 14*a* and the second cylinder 14*b* can rotate around an axis orthogonal to a feed direction 17. The first cylinder 14*a* and the second cylinder 14*b* can rotate at a same speed or a different speed. The first cylinder 14*a* and the second cylinder 14*b* can rotate at a same speed as a substrate 16 moving in a feed direction 17.

The first cylinder 14*a* and the second cylinder 14*b* can rotate in a same or an opposite direction. The first cylinder 14*a* can rotate in a first direction and the second cylinder 14*b* can rotate in a second direction, which is opposite from the first direction. In another aspect, the first cylinder 14*a* and the second cylinder 14*b* can rotate in a same direction.

Figure 3:
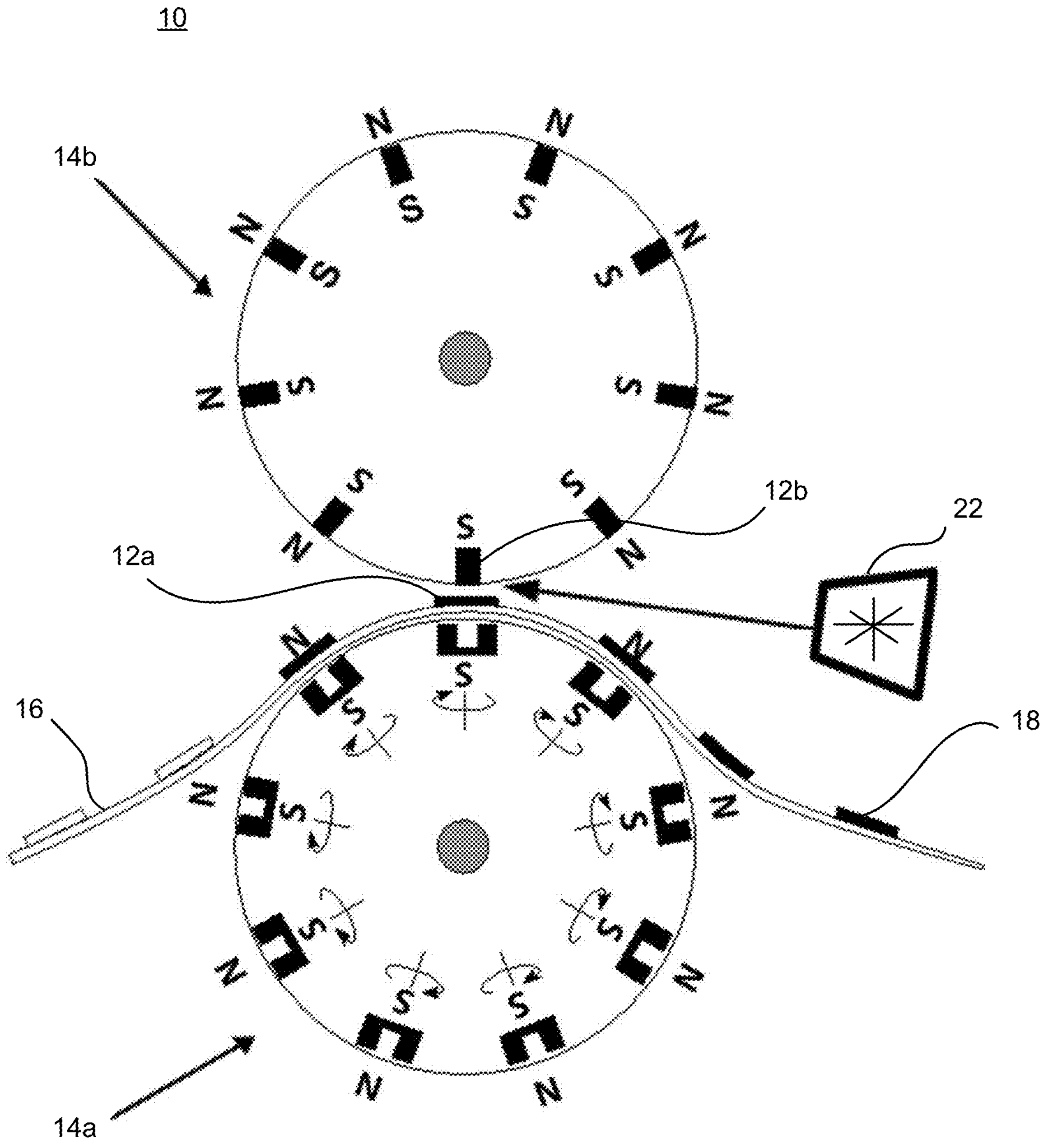
FIG. 3 is a cross-section illustrating a first cylinder including a plurality of magnets, a second cylinder with a plurality of magnets, and a light source.

FIG. 3 illustrates an exemplary assembly 10 including a first cylinder 14*a* and second cylinder 14*b*. Each cylinder 14*a*, 14*b* can include one or more magnets, such as a first magnet 12*a* and a second magnet 12*b*. In an aspect, the one or more magnets, such as a plurality of magnets 12, can be evenly spaced around a circumference of each cylinder 14*a*, 14*b*. The one or more magnets 12*a*, 12*b* can be embedded into each cylinder 14*a*, 14*b*. In an aspect, the first magnet 12*a* can be a plurality of magnets embedded into a first cylinder 14*a*. In another aspect, the second magnet 12*b* can be a plurality of magnets embedded into a second cylinder 14*b*.

In an aspect, a magnet, such as the first magnet 12*a* of the first cylinder 14*a*, can face another magnet, such as the second magnet 12*b* of the second cylinder 14*b*. In an aspect, a first magnet 12*a* in a first cylinder 14*a* can be in register with a second magnet 12*b* in a second cylinder 14*b*.

The assembly 10 can also include a light source 22. The light source 22, such as a laser or a light emitting diode, can emit energy, for example, light in a blue wavelength or an ultraviolet wavelength. The energy can be focused towards a gap between the first cylinder 14*a* and the second cylinder 14*b*. In this manner, the light source 22 can cure a composition, present on a surface of the substrate, and including the plurality of magnetizable platelets 18. For example, the plurality of magnetizable platelets 18, after alignment in a magnetic field 20, can be fixed in the aligned and/or oriented state. The light source 22 can be a laser or a blue LED. The assembly 10 can also include a lens, such as a cylindrical lens. In an aspect, the light source 22, such as a diffracted light source, can refract through the lens to become a collimated light beam.

Figure 4:
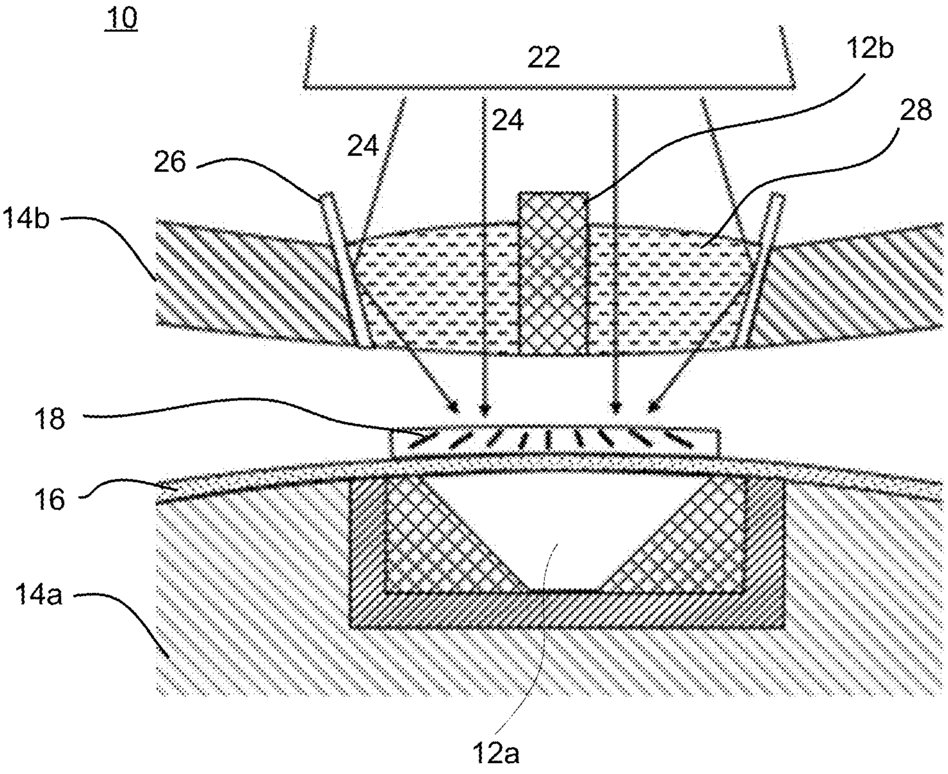
FIG. 4 illustrates an assembly including a second cylinder including a second magnet, a light source, and at least one mirror; and a first cylinder including a first magnet.

In another aspect, as shown in FIG. 4, an assembly 10 can include a light source 22, such as a UV lamp, located inside a second cylinder 14*b*. The first cylinder 14*a* can be solid, and can include a first magnet 12*a* that is funnel-shaped. The first cylinder 14*a* and the second cylinder 14*b* can rotate in a same direction. The second cylinder 14*b* can be hollow to include a second magnet 12*b*, which is cylindrical, and can be positioned within a lens 28, such as a quartz lens. The lens 28 can be surrounded by a metallic mirror 26. The metallic mirror 26 can be a singular cylindrical mirror with a hollow for receiving the lens 28. In another aspect, the metallic mirror, can be one or more metallic mirrors positioned around a lens 28. The light source 22 can emit light beams 24 and can illuminate the lens 28. The light beams 24 can arrive to the composition at a normal angle through the lens 28, while other light beams 24 reflect from the mirror 26.

The magnets 12*a*, 12*b* can be permanent magnets. In an aspect, the first magnet 12*a* and the second magnet 12*b* can be positioned so that a pole of the second magnet 12*b* faces a same pole of the first magnet 12*a*. In another aspect, a pole of the first magnet 12*a* can be positioned to face an opposite pole of the second magnet 12*b*.

A plane of the first magnet 12*a* can be parallel to a plane of the second magnet 12*b*. In an aspect, a plane of the first magnet 12*a* is at an angle greater than 0° to a plane of the second magnet 12*b*. The angle can be between 0° and 180°, for example between 5° and 170°, and as a further example, between 10° and 160°. In an aspect, the angle is about 15°.

The assembly 10 can include a second magnet 12*b* that is statically positioned along a central axis 28. A first magnet 12*a* can revolve around the central axis 28. In an aspect, the assembly 10 can include a first magnet 12*a* and a third magnet 12*c* that can revolve around the central axis 28, and can be positioned beneath a surface of the substrate 16 by a first distance 30. The second magnet 12*b* can be positioned above a substrate 16 by a second distance 32.

The assembly can be used to produce an article, such as an optical security element. A method of producing an optical security element, can comprise moving a substrate 16, in a feed direction 17, between a first cylinder 14*a* including a first magnet 12*a* and a second cylinder 14*b* including a second magnet 12*b*; and rotating the first cylinder 14*a* and the second cylinder 14*b* at a same speed as the substrate 16; wherein a composition including a plurality of magnetizable platelets 18 is present on a surface of the substrate 16. As the substrate 16 moves in the first direction between the first cylinder 14*a* and the second cylinder 14*b*, the magnetizable platelets 18 in the composition can be oriented in the magnetic field 20 generated by the first magnet 12*a* in the first cylinder 14*a* and the second magnet 12*b* in the second cylinder 14*b*. The oriented magnetizable platelets can be cured via a light source. The cured composition can exhibit an image, such as a symbol, a numeral, a shape, and etc. When the substrate 16 with the cured composition is tilted and/or the viewing angle is changed, the image can morph or deform and/or a portion of the image can become lighter or darker relative to another portion of the image.

Example 1

Figure 5A:
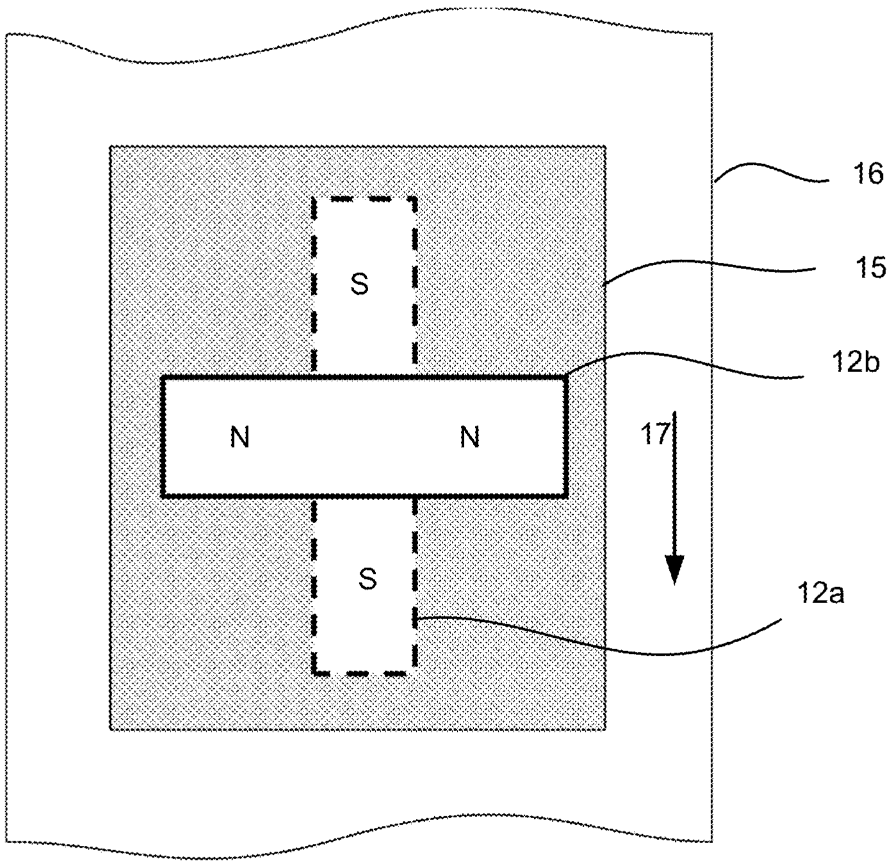
FIG. 5A is a top view illustrating positioning of a first magnet and a second magnet relative to a substrate.

FIG. 5A illustrates a top view of simplified assembly. The planes of the magnets 12*a*, 12*b* were parallel to each other. The first magnet 12*a* was positioned below the substrate 16, which was coated with a composition 15 including magnetizable platelets. The second magnet 12*b* was positioned above the substrate 16. The first magnet 12*a* faced the second magnet 12*b* with their South poles. The substrate 16 was moved in the feed direction 17.

Figure 5B:
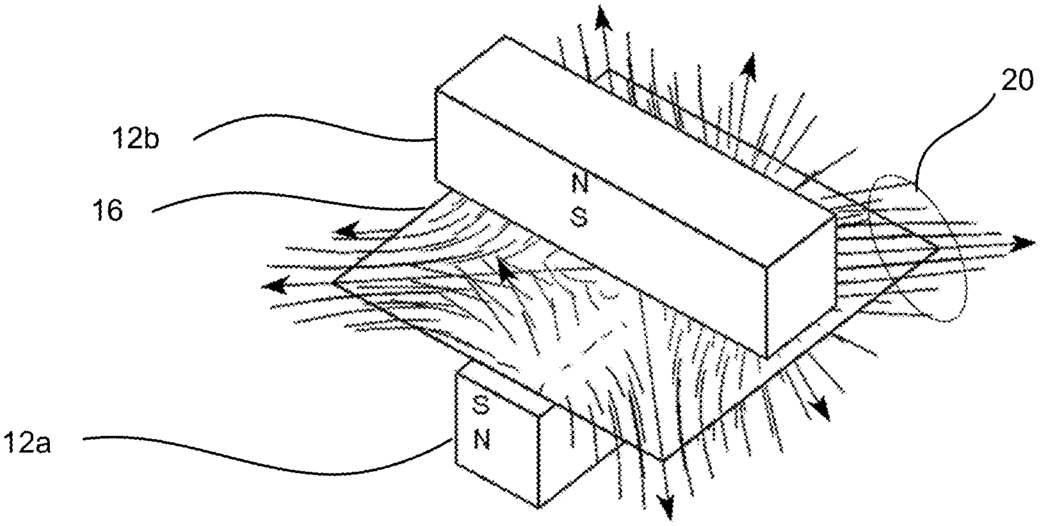
FIGS. 5B and 5C illustrate a magnetic field produced by the first magnet and the second magnet of FIG. 5A.
Figure 5C:
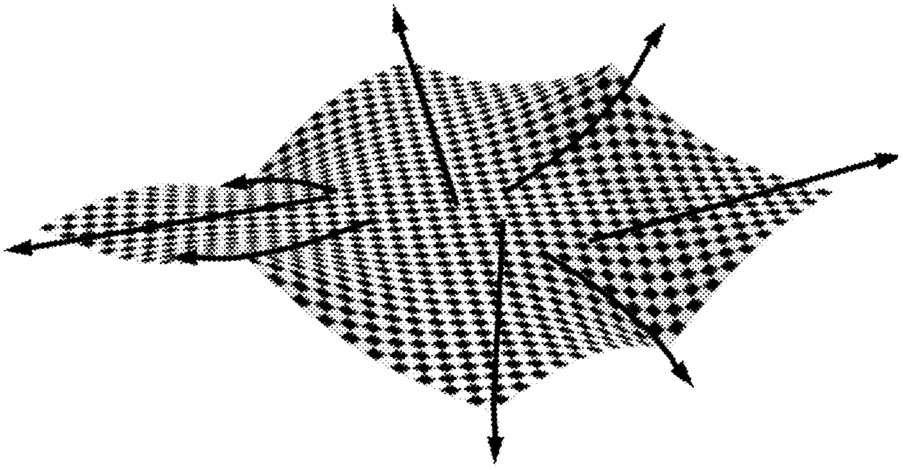
Figure 5D:
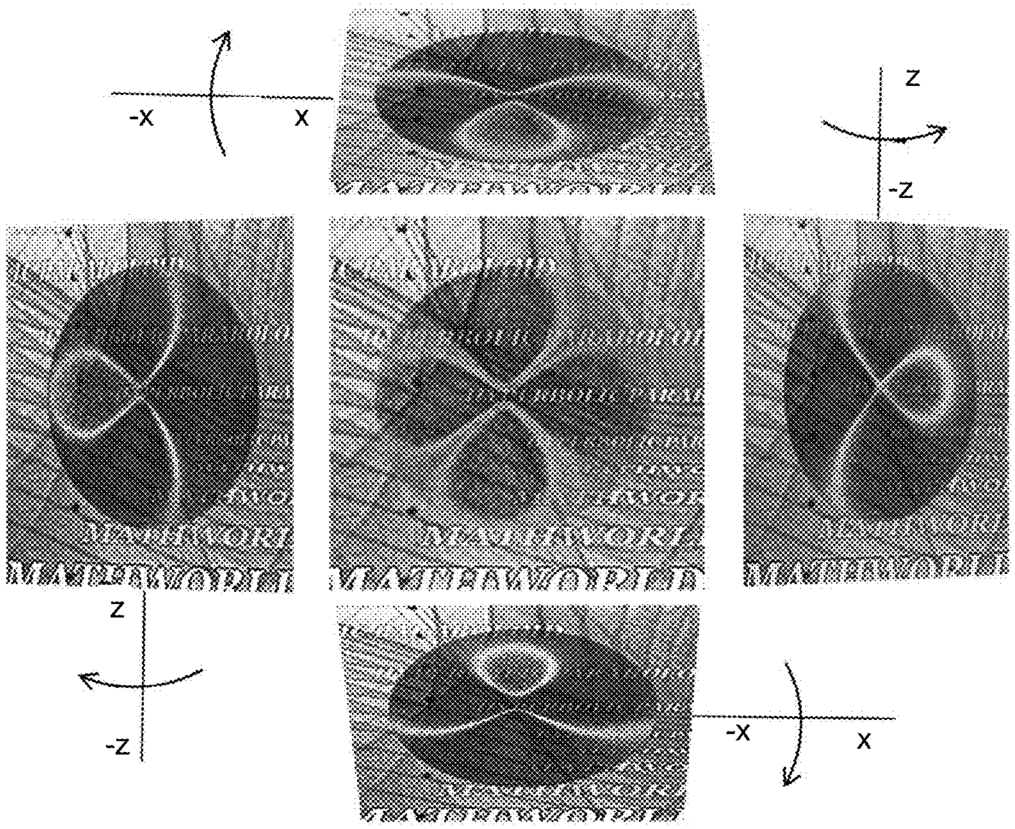
FIG. 5D shows an image generated by the magnetic field in FIGS. 5B and 5C, and how the image changes upon tilting of the substrate.

FIG. 5B illustrates the computer modeling of the magnetic field 20 produced by the first magnet 12*a* and the second magnet 12*b*. The magnetic field in a plane of the substrate 16 are squeezed away in all directions. The magnetizable platelets would align along the magnetic field 20 lines to produce a reflective surface, as shown in FIG. 5C. The assembly illustrated in FIG. 5A orients magnetizable platelets in the printed element producing the optical effect illustrated in FIG. 5D. The central image demonstrated the visual appearance of the print at a normal observation angle. All other images showed the visible appearance changed at their different rotations (tilts) around the horizontal and vertical axis.

Example 2

Figure 6A:
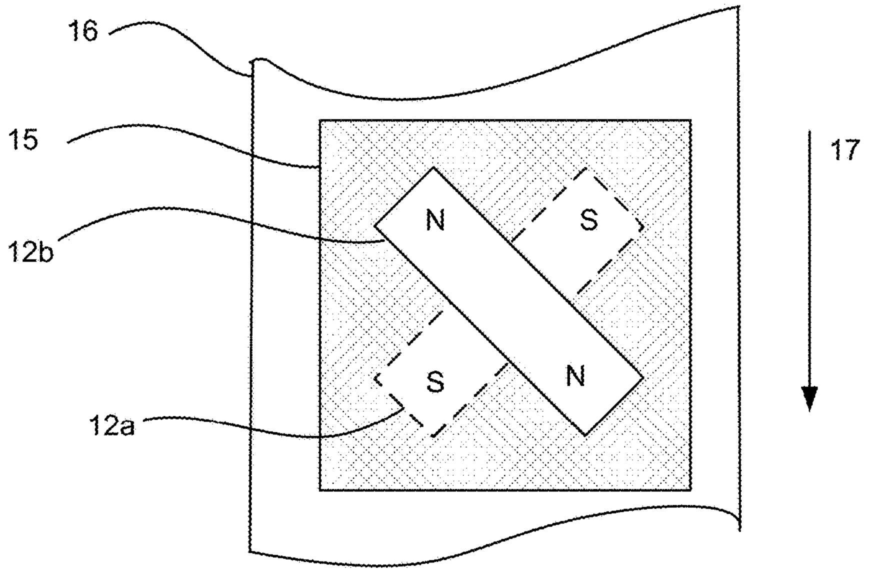
FIG. 6A is a top view illustrating positioning of a first magnet and a second magnet relative to a substrate.
Figure 6B:
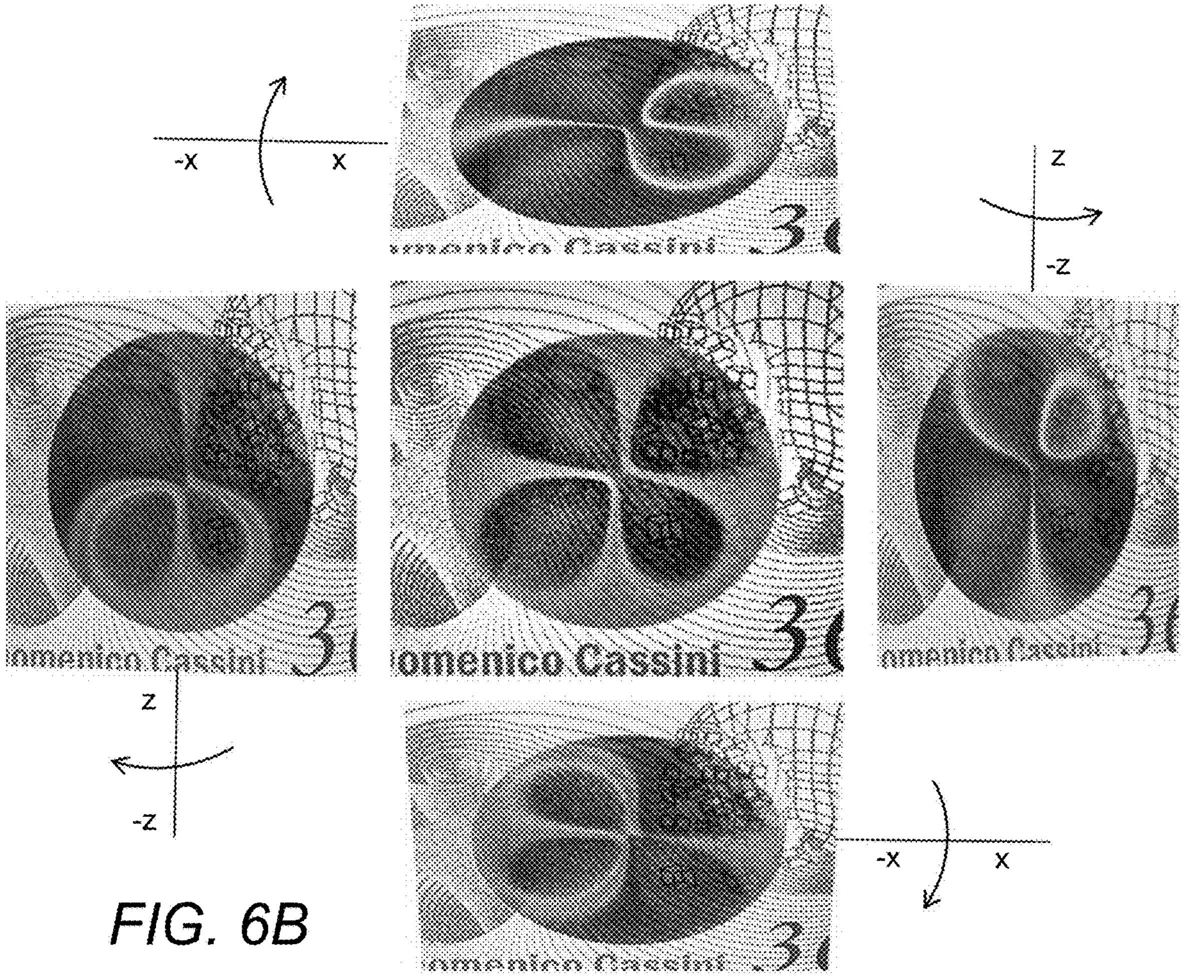
FIG. 6B shows an image generated by the magnetic field in FIG. 6A, and how the image changes upon tilting of the substrate.

FIG. 6A illustrates the same assembly as shown in FIG. 5A is used, but the first magnet 12*a* and the second magnet 12*b* have been rotated 45° in the plane of the substrate 16. The assembly illustrated in FIG. 6A produced the images in FIG. 6B. The central image demonstrated the visual appearance of the print at a normal observation angle. All other images showed the visible appearance changed at their different rotations (tilts) around the horizontal and vertical axis. As can be seen, the images in FIG. 6B are substantially different from the images in FIG. 5D.

Example 3

Figure 7A:
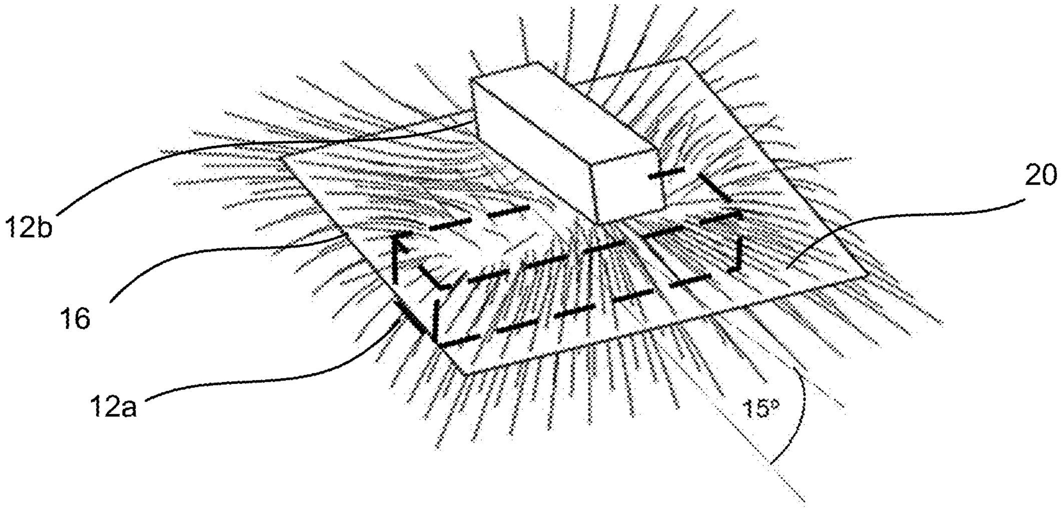
FIG. 7A illustrates a positioning of a first magnet and a second magnet relative to a substrate.
Figure 7B:
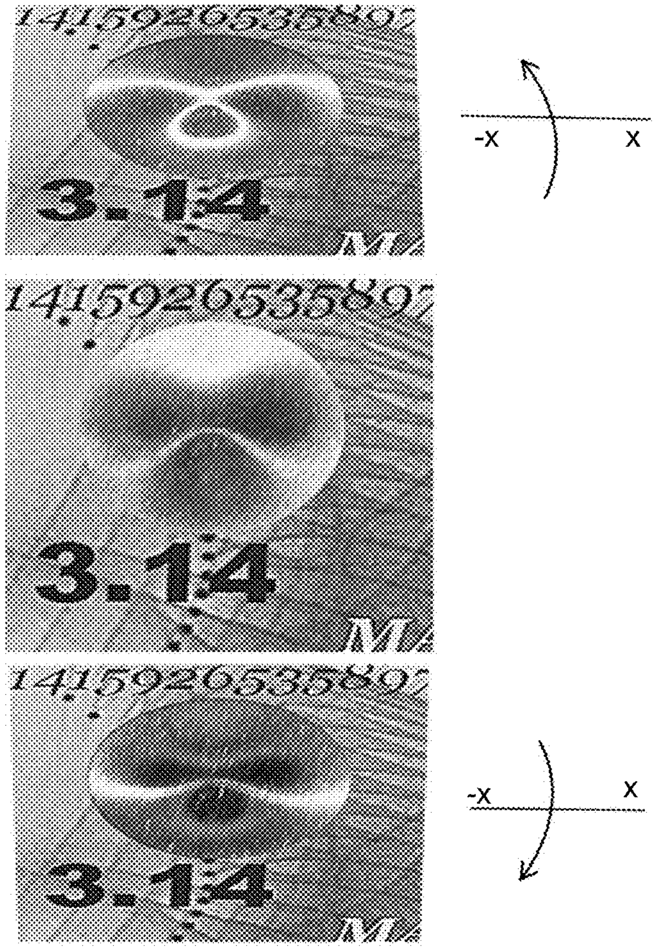
FIG. 7B shows an image generated by the magnetic field in FIG. 7A, and how the image changes upon tilting of the substrate.

The assembly illustrated in FIG. 5A was used, but the planes of the first magnet 12*a* and the second magnet 12*b* were non-parallel. An angle of 15° was between the planes of the first magnet 12*a* and the second magnet 12*b*, as shown in FIG. 7A. An article was printed, as shown in FIG. 7B. The central image demonstrated the visual appearance of the print at a normal observation angle. All other images showed the visible appearance changed at their different rotations (tilts) around the horizontal and vertical axis.

Example 4

Figure 8A:
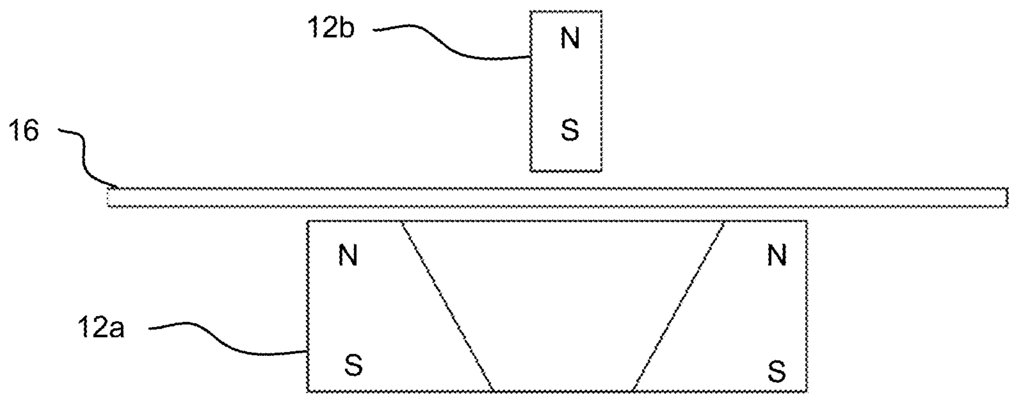
FIG. 8A is a cross-section illustrating a positioning of a first magnet and a second magnet relative to a substrate.
Figure 8B:
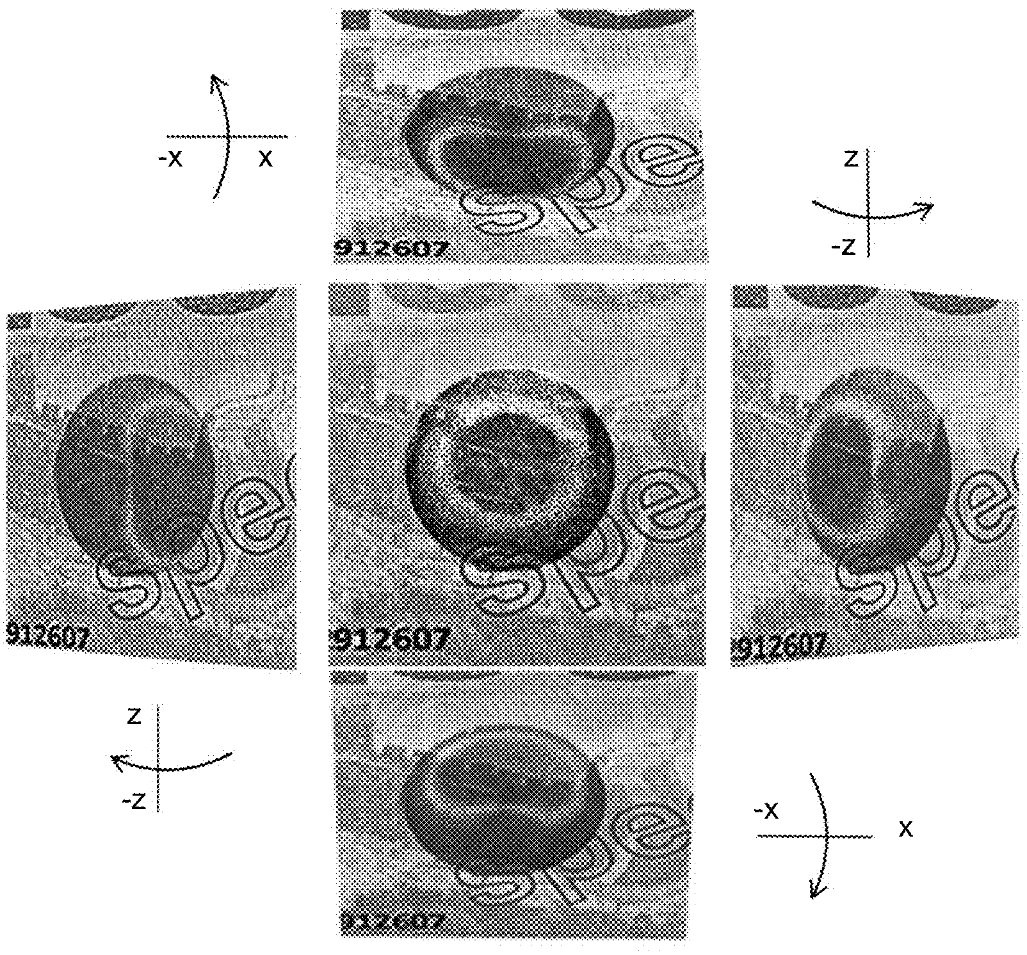
FIG. 8B shows an image generated by a magnetic field from the magnets in FIG. 8A, and how the image changes upon tilting of the substrate.

The assembly included a first magnet 12*a*, which is funnel-shaped, and is positioned under a substrate 16, and a second magnet 12*b* positioned over a substrate 16, as shown in FIG. 8A. Both the first magnet 12*a* and the second magnet 12*b* were mounted in a first cylinder 14*a* (not shown) and a second cylinder 14*b* (not shown), respectively. An article was printed, as shown in FIG. 8B. The central image demonstrated the visual appearance of the print at a normal observation angle. All other images showed the visible appearance changed at their different rotations (tilts) around the horizontal and vertical axis. In particular, a ring can be seen in the middle image that deforms at the different rotation angles of the substrate 16.

Figure 8C:
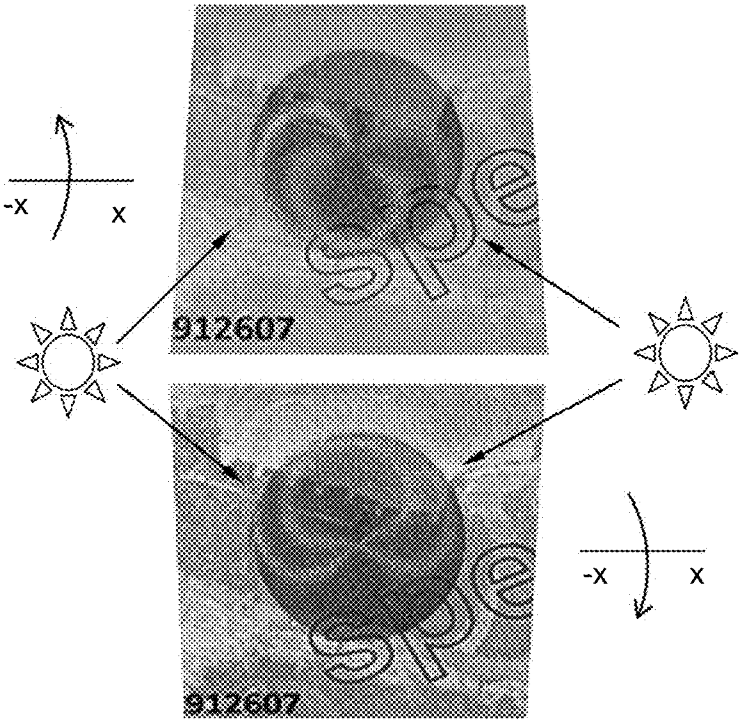
FIG. 8C illustrates how the image in FIG. 8B at a normal observation angle can change when viewed with two separate light sources.

The article of FIG. 8B was illuminated by two different light sources to illustrate how the appearance of an element can change. Each light source produced its own deformed ring (not shown). The use of two different light sources at the same time, makes a "spider" pattern, as shown in FIG. 8C.

Example 5

Figure 9A:
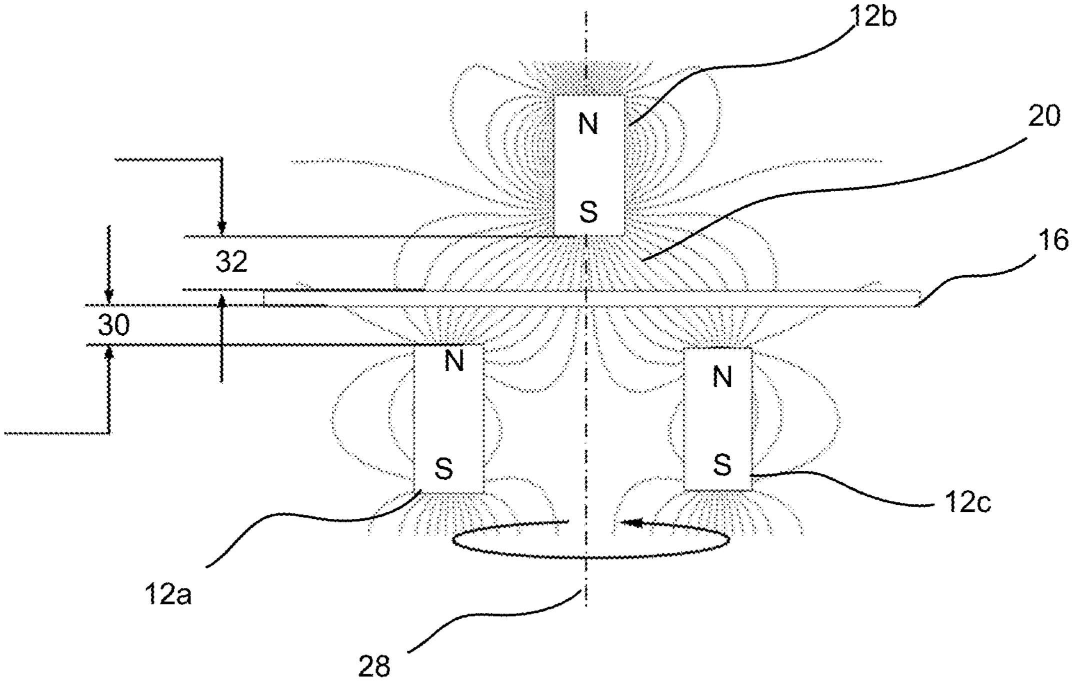
FIG. 9A is a cross-section illustrating a positioning of a first magnet and a third magnet, and a second magnet relative to a substrate.

In another aspect, the assembly can include at least one magnet that can rotate around a central axis, and at least one magnet that is static. As shown in FIG. 9A, an assembly can include a first magnet 12*a* and a third magnet 12*c* with their north poles positioned a first distance 30, about 0.125 inch, to a substrate 16. The first magnet 12*a* is separated from the third magnet 12*c* by a gap of about 1 inch, and each can revolve around a central axis 28. A second magnet 12*b* was concentric to the central axis 28, and was statically mounted above the substrate 16 by a second distance 32, about 0.25 inch, with its south pole facing the rotating magnets 12*a*, 12*c*.

Figure 9B:
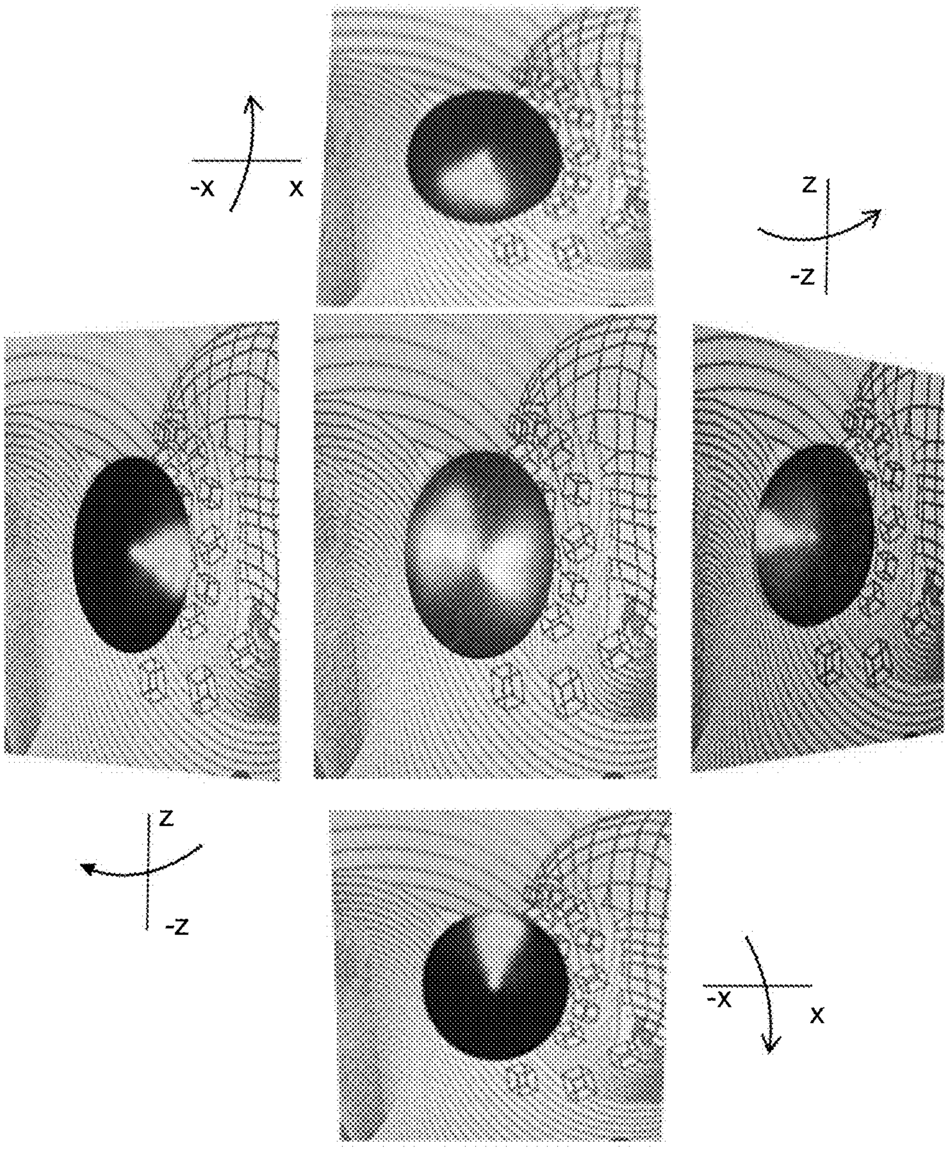
FIG. 9B shows an image generated by the magnetic field in FIG. 9A, and how the image changes upon tilting of the substrate.

The assembly including the at least one rotating magnet and the at least one static magnet was used to produce an article. In particular, a substrate including a composition with a plurality of magnetizable platelets was subjected to a magnetic field 20, as shown in FIG. 9A. The aligned magnetizable platelets produced a Fresnel-like cone reflector, as shown in FIG. 9B. The central image demonstrated the visual appearance at a normal observation angle. All other images showed the visible appearance changed at their different rotations (tilts) around the horizontal and vertical axis.

Figure 9C:
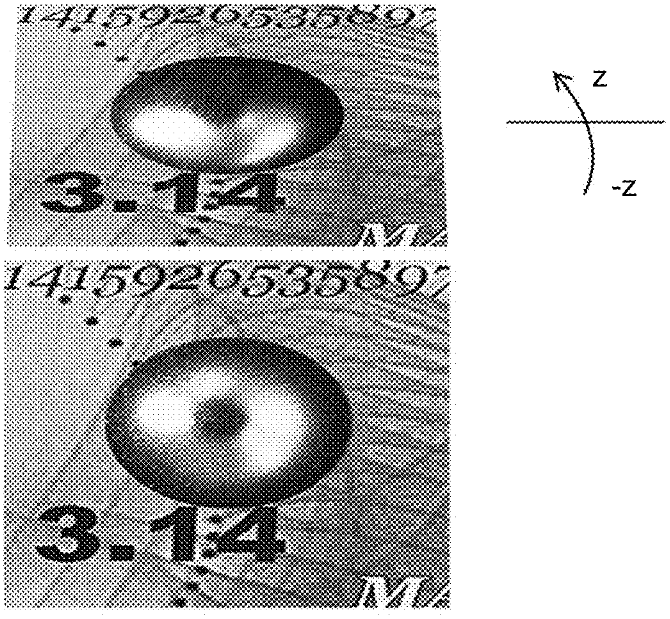
FIG. 9C illustrates how the image from FIG. 9B changes with an alteration in a distance of a magnet to the substrate, and how the image changes upon tilting of the substrate.

The second distance 32 in FIG. 9A was reduced from about 0.25 inch to about 0.1 inch. As shown in FIG. 9C, the appearance of the image changed from a Fresnel-like cone to a crater.

Example 6

Figure 10A:
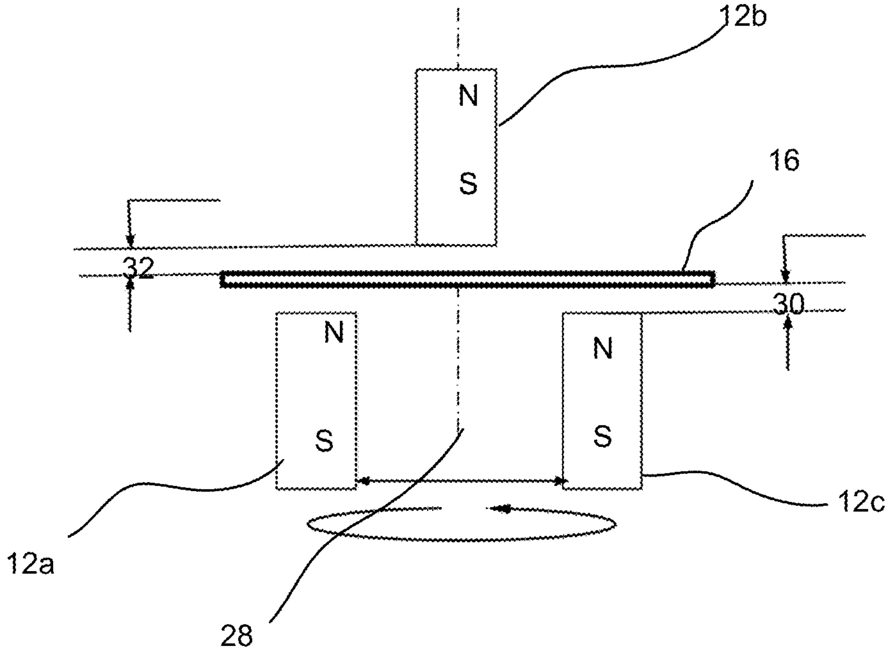
FIG. 10A is a cross-section illustrating a positioning of a first magnet and a third magnet, and a second magnet relative to a substrate and a central axis.
Figure 10B:
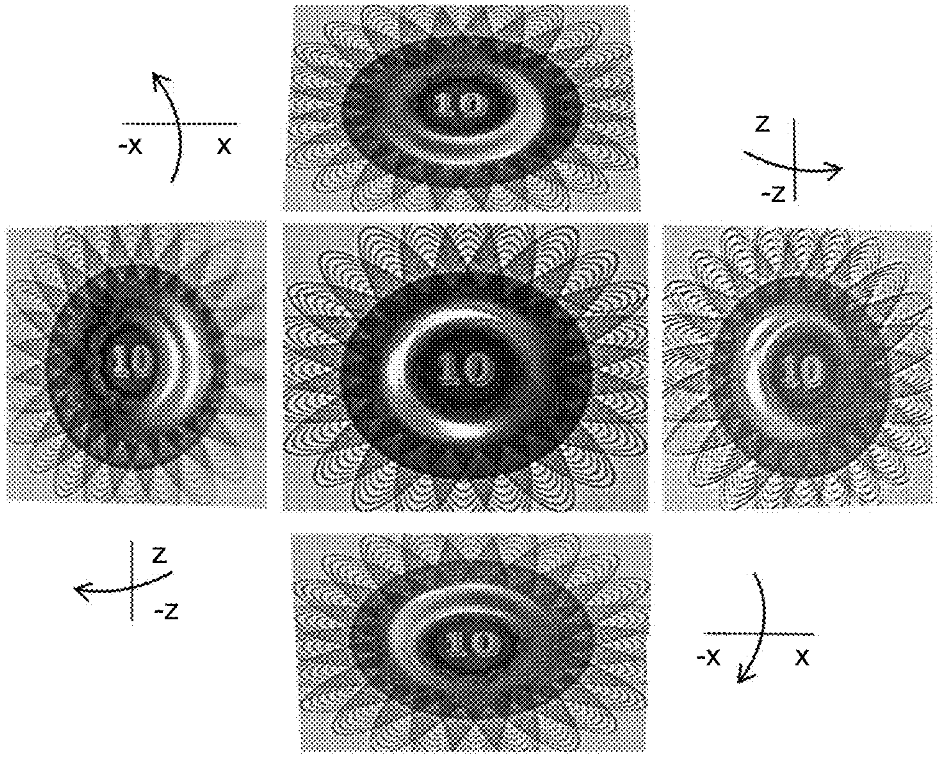
FIG. 10B shows an image generated by a magnetic field of the magnets in FIG. 10A, and how the image changes upon tilting of the substrate.

In another aspect, the assembly of FIG. 9A was used but the magnetic orientation of the second magnet 12*b* was changed. As shown in FIG. 10A, the second magnet 12*b* was turned so its north pole pointed toward the substrate 16 and the first magnet 12*a* and the third magnet 12*c*. The second distance 32 and the second distance were the same, i.e., about 0.07 inches. The repelling magnets 12*b* and 12*a*, 12*c* created a magnetic field (not shown). An article was printed, as shown in FIG. 10B, on a paper substrate 16 with a screen printing technique. The central image demonstrated the visual appearance of the print at a normal observation angle. All other images showed the visible appearance changed at their different rotations (tilts) around the horizontal and vertical axis. In particular, a ring can be seen in the middle image that deforms at the different rotation angles of the substrate 16. As can be seen, an illusion of depth is perceived, i.e., the numeral "10" in the center of the image looks to be about 0.25 inches below the ring's inner edge.

Example 7

Figure 11:
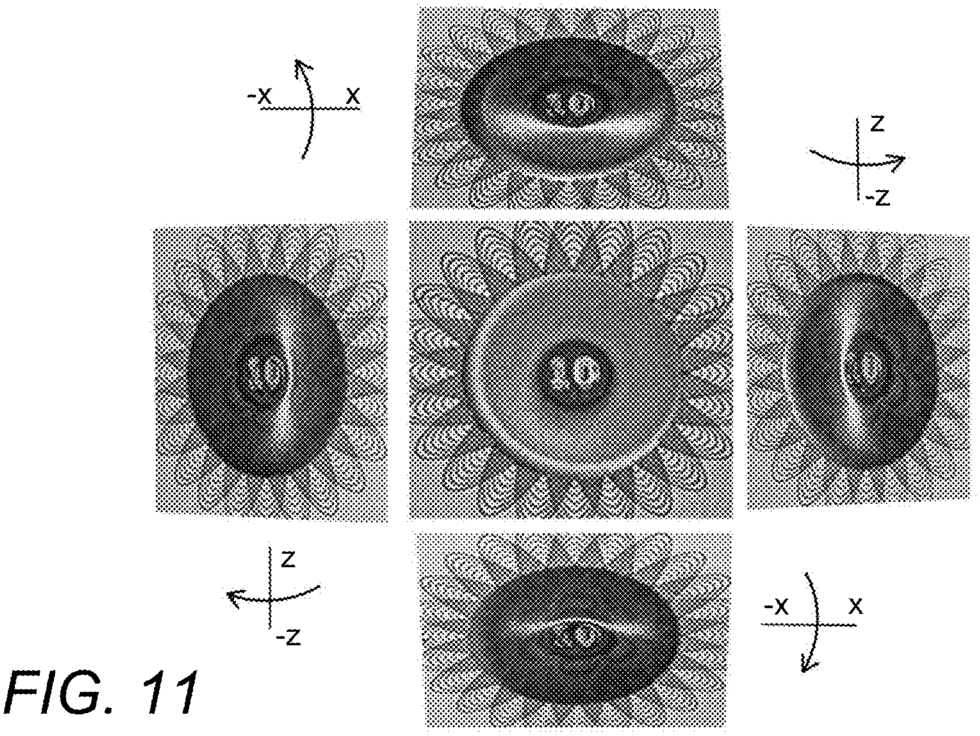
FIG. 11 illustrates how the image from FIG. 9B changes with an alteration in a distance of a magnet to the substrate and a distance between a first magnet and a second magnet, and how the image changes upon tilting of the substrate.

The assembly as shown in FIG. 9A was altered as follows: the first distance 30 and the second distance 32 were each reduced to 0.0625 inches; and the distance between the first magnet 12*a* and the third magnet 12*c* was increased from about 1 inch to about 1.63 inches. An article was printed, as shown in FIG. 11, on a paper substrate 16 with a screen printing technique. The central image demonstrated the visual appearance of the print at a normal observation angle. All other images showed the visible appearance changed at their different rotations (tilts) around the horizontal and vertical axis. In particular, the ring appeared flatter at a normal observation angle. Additionally, at all of the tilt angles, a wave appears instead of the ring.

Example 8

Figure 12A:
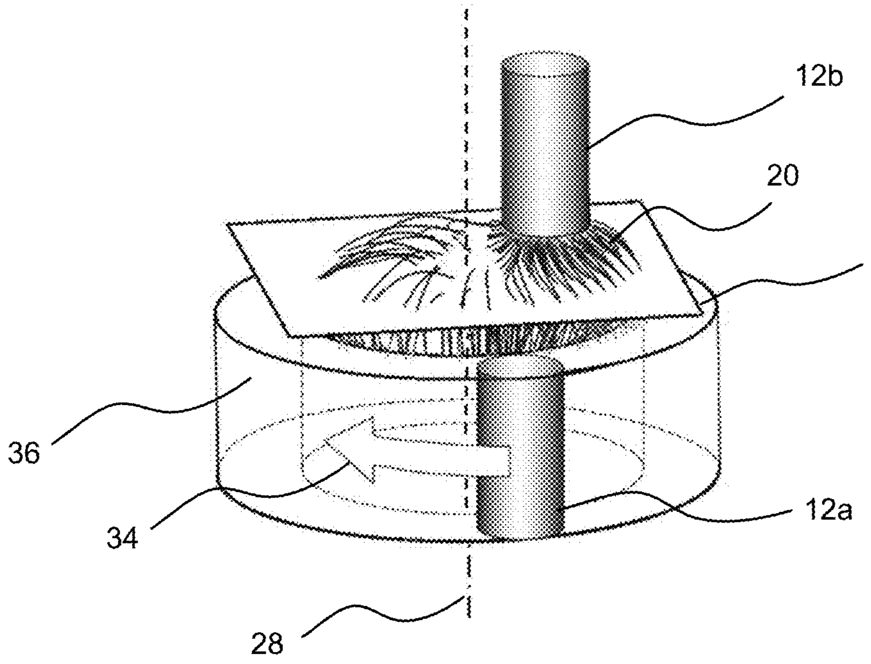
FIG. 12A illustrates a first magnet and a second magnet relative to a substrate and a central axis, the magnetic field generated by rotation of a first magnet.

An advantage of the magnets, such as the first magnet 12*a* and the second magnet 12*b* installed in a first cylinder 14*a* (not shown) and a second cylinder 14*b* (not shown), respectively, is the opportunity of the asymmetric registrations of magnets when they come together with a substrate 16 in between. As shown in FIG. 12A, first magnet 12*a* rotated around central axis 28 in direction 34, forming trajectory 36 underneath the substrate 16. Second magnet 12*b*, statically mounted above substrate 16, generated asymmetric magnetic field 20, continually changing its configuration as first magnet 12*a* rotated.

Figure 12B:
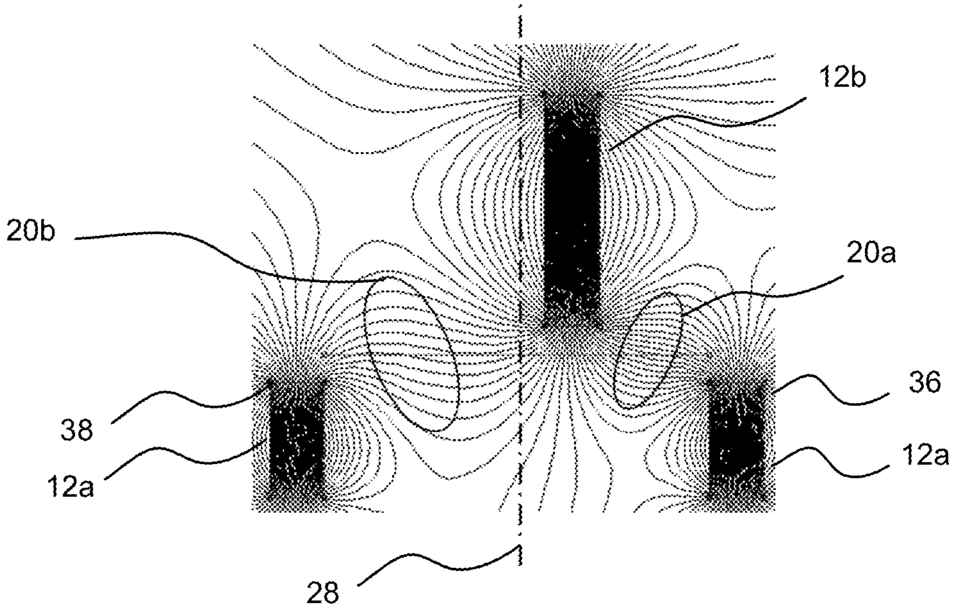
FIG. 12B is a cross-section of FIG. 12A illustrating multiple positions of the first magnet as it rotates about the central axis.

FIG. 12B illustrates the asymmetry in the magnetic field generated by the first magnet 12*a* at two different locations 36 and 38 in the trajectory. The magnetic field in region 20*a* is generated by the first magnet 12*a* in location 36. The magnetic field in region 20*b* is generated by the first magnet 12*a* in location 38.

Figure 12C:
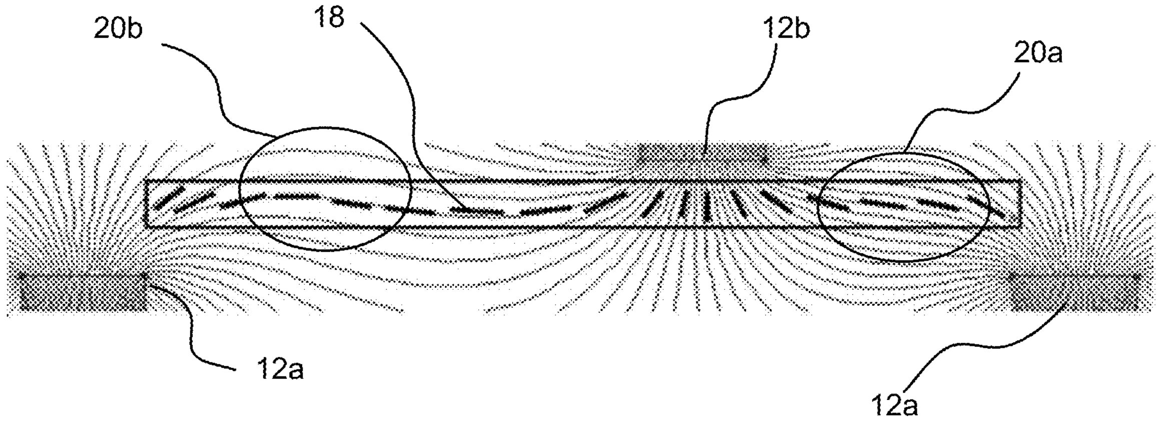
FIG. 12C is an enlarged view of FIG. 12B and illustrates positioning of magnetizable platelets within the magnetic field.
Figure 12D:
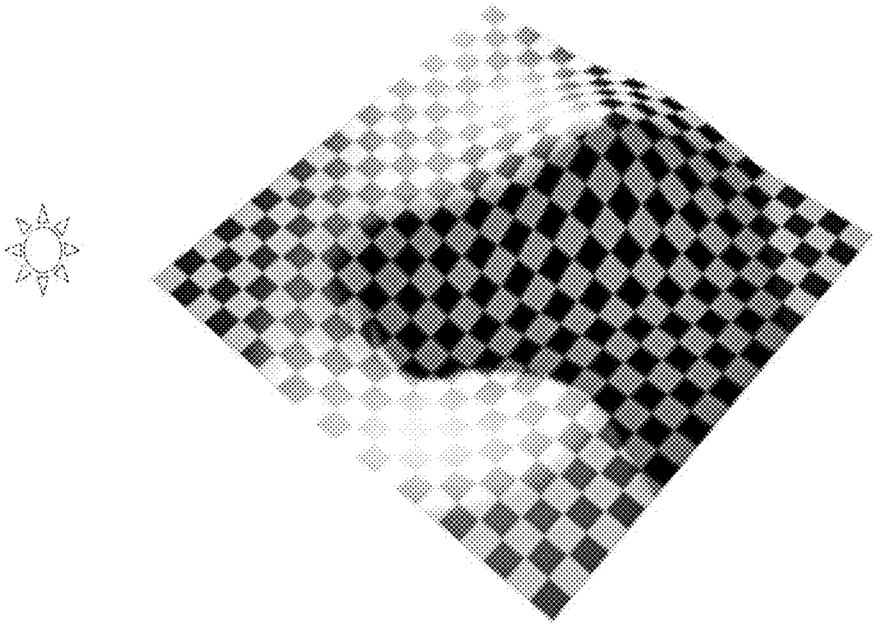
FIG. 12D is a topographical view of the image created by FIG. 12C with a light source.

FIG. 12C illustrates a cross-section of a substrate 16 with a composition including magnetizable platelets 18 that are aligned in a magnetic field 20*a*, 20*b* generated by the assembly shown in FIGS. 12A-12B. The magnetizable platelets 18 aligned in the asymmetric magnetic field can generate a reflecting surface similar to the schematic surface in FIG. 12D with the light source positioned as shown.

Figure 12E:
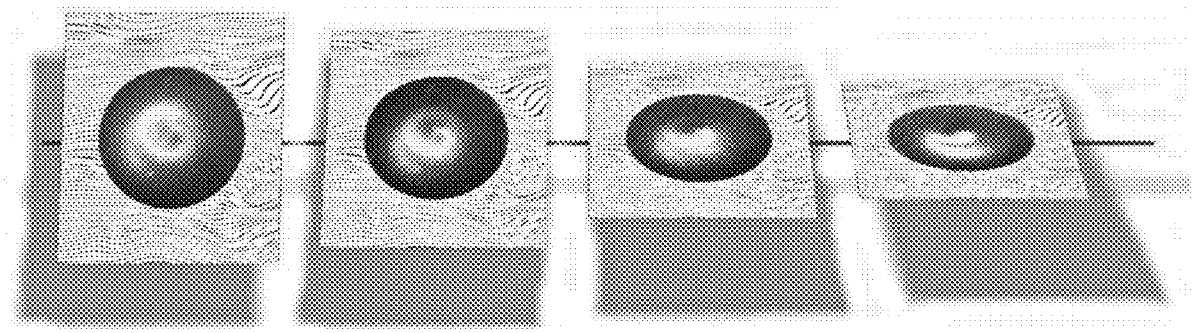
FIG. 12E is an image created by the assembly in FIG. 12A at a normal observation (left image) and how the image changes upon tilting of the substrate.

FIG. 12E is an article made by printing a circle on a substrate 16 with a composition including magnetizable platelets in a magnetic field, as shown in FIGS. 12A-D. The article can exhibit a spiral-like bright shape on a dark background. The shape changed as the substrate 16 is tilted at the angles shown, relative to a normal observation angle.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the coatings, devices, activities and mechanical actions disclosed herein. For each coating, device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a coating and its many aspects, features and elements. Such a coating can be dynamic in its use and operation, this disclosure is intended to encompass the equivalents, means, systems and methods of the use of the device and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. An assembly, comprising:

a first magnet;

a substrate positioned above the first magnet, and having a surface for receiving a composition including a plurality of magnetizable platelets; and a second magnet, positioned above the substrate;

wherein the first magnet is incorporated into a first cylinder, and the second magnet is incorporated into a second cylinder; and wherein the second cylinder is hollow, and the second magnet is cylindrical.

2. The assembly of claim 1, wherein the first cylinder and the second cylinder rotate in a same or an opposite direction.

3. The assembly of claim 1, further comprising a light source.

4. The assembly of claim 3, wherein the light source is a laser or a light emitting diode.

5. The assembly of claim 1, wherein the first magnet is a plurality of magnets embedded into the first cylinder.

6. The assembly of claim 1, wherein the second magnet is a plurality of magnets embedded into the second cylinder.

7. The assembly of claim 4, wherein the light source is the light emitting diode and the light emitting diode emits energy in a blue wavelength or an ultraviolet wavelength.

8. The assembly of claim 1, wherein a pole of the first magnet faces an opposite pole of the second magnet.

9. The assembly of claim 1, wherein the first magnet is positioned a first distance from a surface of the substrate.

10. The assembly of claim 1, wherein first magnet is a plurality of first magnets evenly spaced apart around a circumference of the first cylinder and the second magnet is a plurality of second magnets evenly spaced apart around a circumference of the second cylinder.

11. An assembly, comprising:

a first magnet;

a substrate positioned above the first magnet, and having a surface for receiving a composition including a plurality of magnetizable platelets; and a second magnet, positioned above the substrate;

wherein the first magnet is incorporated into a first cylinder, and the second magnet is incorporated into a second cylinder; and wherein the first cylinder is solid, and the first magnet is funnel-shaped.

12. The assembly of claim 11, wherein the second cylinder is hollow, and the second magnet is cylindrical.

13. The assembly of claim 12, wherein the second magnet is positioned within a lens, which is surrounded by metallic mirrors.

14. The assembly of claim 1, wherein a pole of the second magnet faces a same pole of the first magnet.

15. The assembly of claim 1, wherein a plane of the first magnet is parallel to a plane of the second magnet.

16. The assembly of claim 1, wherein a plane of the first magnet is at an angle greater than 0° to a plane of the second magnet.

17. An assembly, comprising:

a first magnet;

a substrate positioned above the first magnet, and having a surface for receiving a composition including a plurality of magnetizable platelets; and a second magnet, positioned above the substrate;

wherein the second magnet is cylinder shaped, and the first magnet is funnel-shaped.

18. The assembly of claim 17, wherein the first magnet is incorporated into a first cylinder, and the second magnet is incorporated into a second cylinder.

19. An assembly, comprising:

a first magnet;

a substrate positioned above the first magnet, and having a surface for receiving a composition including a plurality of magnetizable platelets; and a second magnet, positioned above the substrate;

wherein the second magnet is statically positioned along a central axis; and wherein the first magnet revolves around the central axis.

* * * * *